(12) United States Patent
Ho et al.

(10) Patent No.: US 12,321,085 B2
(45) Date of Patent: Jun. 3, 2025

(54) SUBMERSIBLE CAMERA FOR UNDERWATER VEHICLES

(71) Applicant: DeepWater Exploration, Inc., La Jolla, CA (US)

(72) Inventors: Jiajer Ho, La Jolla, CA (US); Brandon Stevens, Palos Verdes Estates, CA (US); Warren Chang, San Diego, CA (US); Benjamin Stirling, Poway, CA (US)

(73) Assignee: Deepwater Exploration, Inc., La Jolla, CA (US)

( * ) Notice: Subject to any disclaimer, the term of this patent is extended or adjusted under 35 U.S.C. 154(b) by 213 days.

(21) Appl. No.: 18/136,224

(22) Filed: Apr. 18, 2023

(65) Prior Publication Data

US 2023/0341750 A1   Oct. 26, 2023

Related U.S. Application Data

(60) Provisional application No. 63/334,108, filed on Apr. 23, 2022.

(51) Int. Cl.
| | |
|---|---|
| *G03B 17/08* | (2021.01) |
| *G03B 17/56* | (2021.01) |
| *G02B 7/02* | (2021.01) |

(52) U.S. Cl.
CPC ........... *G03B 17/08* (2013.01); *G03B 17/561* (2013.01); *G02B 7/022* (2013.01)

(58) Field of Classification Search
None
See application file for complete search history.

(56) References Cited

U.S. PATENT DOCUMENTS

| | | | | | |
|---|---|---|---|---|---|
| 4,994,829 | A | * | 2/1991 | Tsukamoto | G03B 17/08 359/507 |
| 5,177,515 | A | * | 1/1993 | Tsukamoto | G03B 17/08 396/27 |
| 5,530,499 | A | * | 6/1996 | Mori | G03B 17/08 396/29 |
| 6,311,017 | B1 | * | 10/2001 | Mori | G03B 17/08 396/25 |
| 6,507,700 | B1 | * | 1/2003 | Takekuma | G03B 17/08 396/25 |
| 7,929,225 | B2 | * | 4/2011 | Sasaki | G02B 7/021 359/821 |
| 11,714,336 | B2 | * | 8/2023 | Kim | G02B 7/028 396/535 |
| 2006/0263075 | A1 | * | 11/2006 | Juan | G03B 17/08 396/29 |

(Continued)

*Primary Examiner* — Rodney E Fuller
(74) *Attorney, Agent, or Firm* — Procopio, Cory, Hargreaves & Savitch LLP

(57) ABSTRACT

A conventional submersible camera utilizes an O-ring to waterproof the interior of the camera housing. Larger components are required to accommodate this O-ring, which increases the cost and size of the submersible camera. Disclosed embodiments utilize a sealing ring between a circumferential edge of a lens dome and the housing. These embodiments may also utilize a circular printed circuit board that lies in a plane that is perpendicular to the longitudinal axis of the submersible camera. Advantageously, these features enable the submersible camera to be more compact and manufactured at lower cost.

20 Claims, 4 Drawing Sheets

(56) References Cited

U.S. PATENT DOCUMENTS

| | | | |
|---|---|---|---|
| 2013/0142504 A1* | 6/2013 | Warren | G03B 17/08 |
| | | | 396/541 |
| 2014/0001708 A1* | 1/2014 | Ewing | F16J 15/106 |
| | | | 277/590 |
| 2018/0141738 A1* | 5/2018 | Armano | B65D 85/50 |
| 2018/0341169 A1* | 11/2018 | Yang | H04N 23/55 |
| 2018/0352121 A1* | 12/2018 | Chapman | F21V 31/005 |
| 2022/0373662 A1* | 11/2022 | Crawford | G01S 17/66 |

* cited by examiner

SUBMERSIBLE CAMERA FOR UNDERWATER VEHICLES

CROSS-REFERENCE TO RELATED APPLICATIONS

This application claims priority to U.S. Provisional Patent App. No. 63/334,108, filed on Apr. 23, 2022, which is hereby incorporated herein by reference as if set forth in full.

BACKGROUND

Field of the Invention

The embodiments described herein are generally directed to a waterproof housing, and, more particularly, to a submersible camera for underwater vehicles.

Description of the Related Art

Underwater vehicles are vital tools for scientific research, as well as commercial applications. Examples of underwater vehicles include, without limitation, a remotely operated vehicle (ROV), an autonomous underwater vehicle (AUV), an autonomous surface vessel (ASV), a manned underwater vehicle (MUV), and the like. Many underwater vehicles require high quality cameras, which are typically used for general-purpose vision for manual piloting and/or computer vision for autonomous piloting of the underwater vehicles. The housing of each camera should hermetically seal the internal electronics from the intrusion of water, while being minimally sized and simple to integrate into the underwater vehicle.

Conventional camera housings utilize an O-ring to waterproof the lens dome of the camera, which is generally a glass element. To compress the O-ring into place and create a watertight seal, a constant pressure must be applied from a first side of the lens dome to the O-ring on an opposing second side of the lens dome, to thereby seal the O-ring between the lens dome and an element of the housing. In order to create this constant pressure, an additional component must be secured to the first side of the lens dome and attached to the main housing. However, such an assembly poses multiple problems.

Firstly, the O-ring and the additional component require a clearance on the periphery of the lens dome. In order to accommodate this clearance, while maintaining the same field of view, the diameter of the lens dome and the width of the housing must be increased. This increases the cost of the assembly, increases the size of the camera, and increases the weight of the camera.

Secondly, the additional component may cause reflections on the imaging sensor, which can detrimentally affect the image quality of images captured by the camera. The additional component can also create extra drag, and must be mounted via screws or threading, which can complicate the camera assembly. In the event that screws are used, the screws pose an additional problem, since a screw can accelerate galvanic corrosion, and the threads can fuse into place or be worn off due to the buildup of fine sediment or residue. Even if the screws utilize anodized aluminum or a powder coating to provide chemical resistive properties, a threaded design will inevitably scratch off the coating, over time, to expose the underlying metal of the screw to water and facilitate corrosive wear.

Thirdly, O-rings tend to be temperamental. Thus, reconditioning, relubrication, and replacement are often necessary for extreme environments. This requires the camera to be repeatedly disassembled and reassembled, which can accelerate wear and decrease the service life of the camera.

In addition, in conventional camera housings, a primary printed circuit board (PCB) is generally rectangular and oriented perpendicularly to the glass element. A secondary printed circuit board, containing the imaging sensor, then connects to, and is secured in place on, the primary printed circuit board. Because the primary printed circuit board is oriented perpendicularly to the glass element, the housing must be long enough to accommodate the length of the primary printed circuit board.

Furthermore, conventional cameras generally use an Ethernet connection for connecting the camera to an external system. In particular, the camera may be connected via a wired connection to an Ethernet router onboard the underwater vehicle. The Ethernet router may support multiple cameras, which provide different views from the underwater vehicle. The Ethernet router is communicatively coupled with a computer, onboard the underwater vehicle, and supplies all of the image data, output by the cameras, to the computer, which processes this image data. In other words, the Ethernet router communicatively couples the cameras, and potentially other devices, to an onboard computer for processing. While Ethernet supports long-distance communications and has been used for decades, cameras that utilize Ethernet for communication require higher complexity, since each camera needs to individually start a camera stream. This requires the primary printed circuit board to be larger, in order to support the additional computational processing required by the higher complexity. The increase in the size of the primary printed circuit board requires a corresponding increase in the size of the camera housing.

The present disclosure is directed to addressing one or more of these problems and other problems discovered by the inventors.

SUMMARY

In an embodiment, a submersible camera comprises: a housing assembly that comprises a housing cone, a transparent lens dome, and a sealing ring between a radially outward facing circumferential edge of the lens dome and a radially inward facing surface of the housing cone, wherein the sealing ring is annular around a longitudinal axis of the submersible camera; and an imaging assembly positioned within an interior cavity of the housing assembly, wherein the imaging assembly comprises a printed circuit board, a lens holder fastened to one side of the printed circuit board facing the lens dome, and a lens mounted in the lens holder.

The housing assembly may have a circular profile in a plane that is perpendicular to the longitudinal axis, and the printed circuit board may be oriented perpendicularly to the longitudinal axis with a circular profile in a plane that is perpendicular to the longitudinal axis.

The housing assembly may further comprise a cap that is fastened to the housing cone on an opposite end of the housing cone as the lens dome. The cap may be fastened to the housing cone via corresponding threads. The housing cone may comprise first threading on a first radially facing surface, the cap may comprise second threading on a second radially facing surface, and the first threading and the second threading may be configured to engage with each other to fasten the cap to the housing cone.

The cap may comprise a central aperture extending through the cap along the longitudinal axis, wherein the central aperture is configured to receive a cable therethrough. The cable may be attached on one end to the printed circuit board and extend from the printed circuit board, through the central aperture, and into an external environment of the submersible camera, wherein the cable provides both power to the printed circuit board and data transfer with the printed circuit board. The central aperture with the cable extending therethrough may be sealed by a sealing compound. The sealing compound may be epoxy.

The housing assembly may further comprise a gasket between the housing cone and the cap, wherein the gasket is annular around the longitudinal axis. The gasket may be formed from a nitrile material.

The sealing ring may be formed from a hard polymer material. The sealing ring may be formed from thermoplastic copolyester. The sealing ring may be formed from thermoplastic elastomer. The sealing ring may be formed from polytetrafluoroethylene.

The circumferential edge of the lens dome may be beveled.

The housing cone may comprise a lip that extends radially inward relative to the radially inward facing surface of the housing cone, wherein the lip abuts one side of the lens dome.

The lens may be mounted in the lens holder via corresponding threads.

In an embodiment, a system comprises: the submersible camera; and a mount comprising a camera holder that encircles the submersible camera. The mount may further comprise a stand that is fastened to the camera holder at two points, such that the camera holder is rotatable around an axis that extends through the two points.

It should be understood that any of the features described above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Embodiments of a submersible camera are disclosed. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Figure 1:
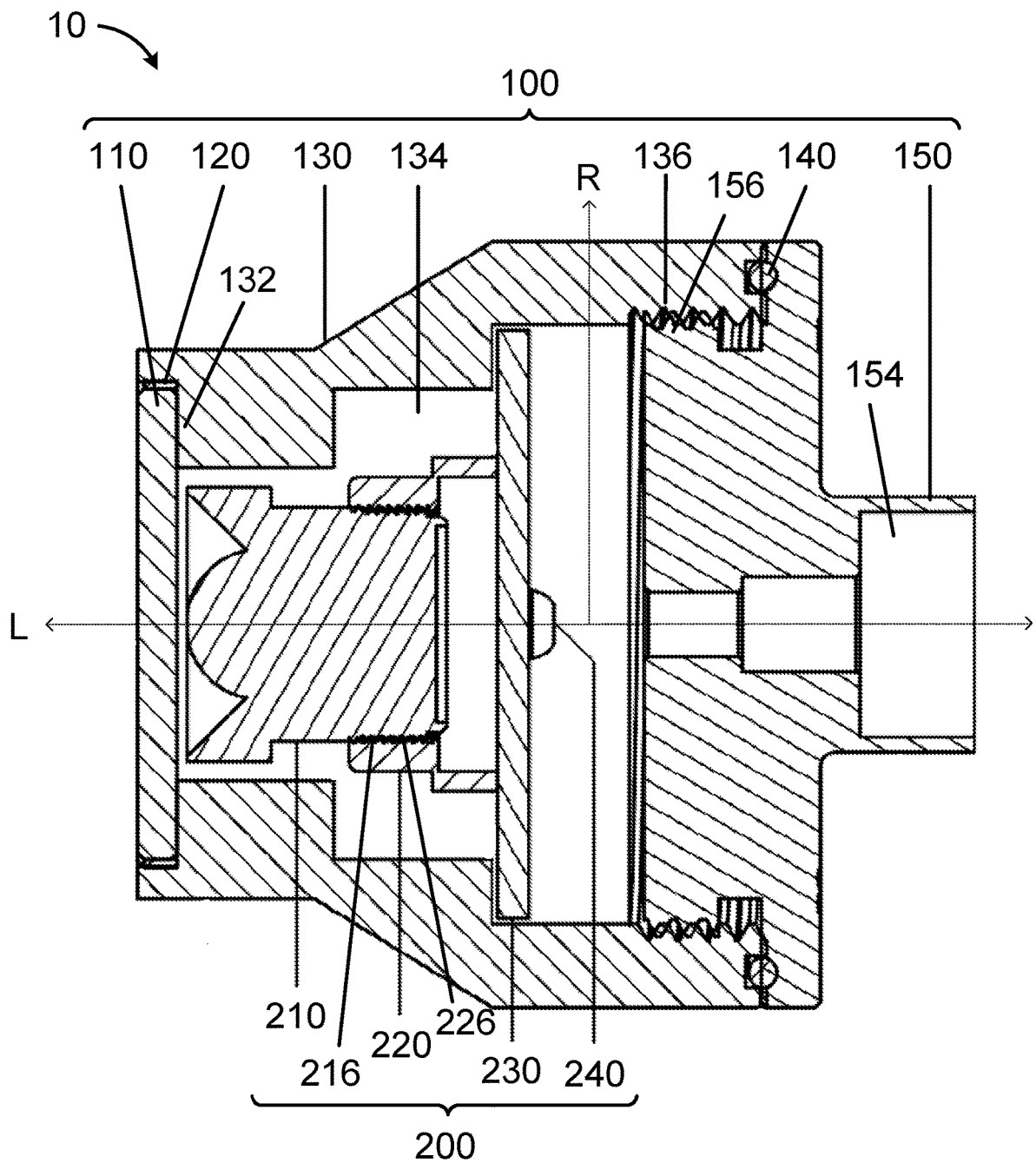
FIG. 1 illustrates a cross-sectional view of a submersible camera, according to an embodiment.
Figure 2:
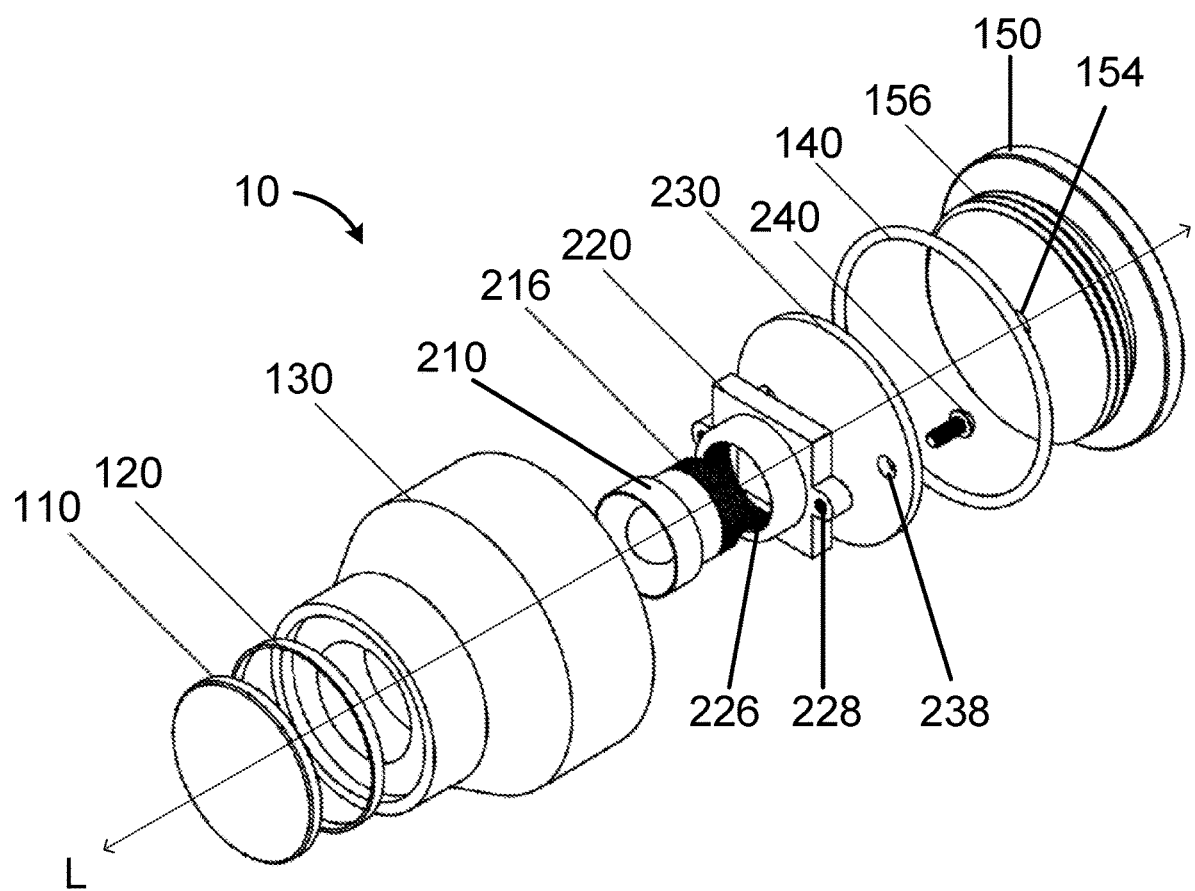
FIG. 2 illustrates an exploded perspective view of a submersible camera, according to an embodiment.

FIG. 1 illustrates a cross-sectional view of a submersible camera 10, and FIG. 2 illustrates an exploded perspective view of the same submersible camera 10, according to an embodiment. Submersible camera 10 comprises a housing assembly 100 and an imaging assembly 200. When fully assembled, housing assembly 100 encloses and hermetically seals imaging assembly 200, within an interior cavity 134 of housing assembly 100, against fluid, such as water. Submersible camera 10 has a longitudinal axis L that extends through the longitudinal center of submersible camera 10.

As used herein, the term "radial" refers to a position or direction along an axis that extends perpendicularly from longitudinal axis L. One such axis is illustrated as radial axis R. In contrast, the term "axial" refers to a position or direction along any axis that is parallel to longitudinal axis L. The term "front" may be used to refer to a side of submersible camera 10 or any component of submersible camera 10 that is closer to or facing the field of view of imaging assembly 200, along longitudinal axis L. The term "rear" may be used to refer to a side of submersible camera 10 or any component of submersible camera 10 that is farther from or facing away from the field of view of imaging assembly 200, along longitudinal axis L. It should be understood that these terms are only used for the convenience of explanation, and do not imply any particular position or orientation of submersible camera 10 in three-dimensional space or relative to an underwater vehicle.

Housing assembly 100 may comprise a lens dome 110, a sealing ring 120, a housing cone 130, a gasket 140, and a cap 150. Lens dome 110 may be a solid, thin cylinder formed of a transparent material, such as glass, quartz, sapphire, and/or the like. In other words, lens dome is a circular window that enables light to pass between an exterior environment of submersible camera 10 and interior cavity 134. In alternative embodiments, lens dome 110 may have a different shape than a cylinder and/or may be formed from one or more different materials.

Sealing ring 120 is seated between the radially outward facing circumferential edge of lens dome 110 and a radially inward facing surface of housing cone 130. Sealing ring 120 is annular around longitudinal axis L. The circumferential edge of lens dome 110 may be beveled, such that the circumferential edge of lens dome 110 does not have any sharp corners that could tear sealing ring 120. Additionally or alternatively, the circumferential edge of lens dome 110 may be ground or polished to ensure solid, uniform contact between the circumferential edge of lens dome 110 and the radially inward facing surface of sealing ring 120.

Sealing ring 120 may be formed from a hard polymer material, such as thermoplastic copolyester (TPC), thermoplastic elastomer (TPE), polytetrafluoroethylene (PTFE), or the like. The axial width of sealing ring 120 may be at least as wide as the axial width of the circumferential edge of lens dome 110, such that sealing ring 120 completely overlaps and surrounds the circumferential edge of lens dome 110 from the front side of lens dome 110 to the rear side of lens dome 110.

Sealing ring 120 encircles lens dome 110 to create a tight waterproof seal without the need of an O-ring. Functionally, sealing ring 120 forms two interference fits: a first interference fit with the radially outward facing circumferential edge of lens dome 110; and a second interference fit with the radially inward facing surface of housing cone 130. The hard polymer material of sealing ring 120 ensures that the seal deforms to the shape of lens dome 110, thereby promoting the fidelity of the seal. In such an embodiment, since sealing ring 120 is not a soft elastomer (e.g., neoprene), failure modes, such as compression set, are eliminated.

The pressure from lens dome 110 and sealing ring 120 against the radially inward facing surface of housing cone 130 is tight enough to hold lens dome 110 in place, without the need for any additional parts, such as screws or threads. This improves the reliability of submersible camera 10 in embodiments in which housing cone 130 is formed from aluminum, because the lack of screws and threads eliminates the risk of scratching the outer layer of housing cone 130, which may be anodized or powder-coated. In addition, unlike O-rings, which require periodic reconditioning, lubrication is not required to activate sealing ring 120. Consequently, the utilization of sealing ring 120, in place of an O-ring, also improves the service life of submersible camera 10.

Housing cone 130 may comprise a lip 132 that extends radially inward relative to the radially inward facing surface of housing cone 130 against which sealing ring 120 is seated. Lip 132 may abut the rear side of lens dome 110 on a narrow periphery of lens dome 110, as well as the rear side of sealing ring 120. Thus, lip 132 prevents axial translation of lens dome 110 and sealing ring 120 past the radially inward facing surface against which sealing ring 120 is seated (i.e., towards the rear of submersible camera 10). Lip 132 also provides an additional seal against the intrusion of fluid into housing 100. Essentially, lens dome 110 is held in place by sealing ring 120 and lip 132. Housing cone 130 may be formed from any suitable material, including, without limitation, aluminum, steel, titanium, other suitable metallic alloy, ceramic, or the like. Housing cone 130 may be shaped hydrodynamically to reduce drag during movement of submersible camera 10 through fluid.

With sufficient force during assembly of housing 100, lens dome 110 can be pressed into sealing ring 120, while sealing ring 120 is seated within housing cone 130. As lens dome 110 is pressed into sealing ring 120, lip 132 prevents lens dome 110 from being pushed beyond a set distance (i.e., the axial width of the radially inward facing surface of housing cone 130 against which sealing ring 120 is seated) into housing cone 130. Housing cone 130 may be manufactured with fine tolerances around the radially inward facing surface in which sealing ring 120 is seated and lip 132 against which lens dome 110 is mounted, to provide a good fit with lens dome 110 and sealing ring 120.

Cap 150 may be fastened to the rear end of housing cone 130 (i.e., the opposite end of housing cone 130 as lens dome 110) via one or more engagement members 156, on a radially outward facing surface of cap 150, that are configured to mate with one or more corresponding engagement members 136 on a radially inward facing surface of housing cone 130. For example, engagement member(s) 136 and 156 may comprise threads that are configured to mate or engage with each other when screwed together. Alternatively, cap 150 may be joined to the rear end of housing cone 130 via one or more engagement members (e.g., threads), on a radially inward facing surface of cap 150, that are configured to mate with one or more corresponding engagement members (e.g., corresponding threads) on a radially outward facing surface of housing cone 130. As another alternative, a rear portion of housing cone 130 may be secured over a front portion of cap 150 or a front portion of cap 150 may be secured over a rear portion of housing cone 130 via an interference fit. In other words, one of housing cone 130 or cap 150 may be press-fitted into the other one of housing cone 130 or cap 150. In either case, cap 150 may be formed from the same material as housing cone 130.

Gasket 140 may be seated within corresponding grooves in a rear-facing surface of housing cone 130 and a front-facing surface of cap 150. Alternatively, gasket 140 may be seated in only one groove in either the rear-facing surface of housing cone 130 or the front-facing surface of cap 150. The groove(s) and gasket 140 may each be annular around longitudinal axis L, and gasket 140 may be configured to compress within the groove(s) when cap 150 is mated to housing cone 130. Gasket 140 may be permanently fixed within the groove of either housing cone 130 or cap 150. Gasket 140 may be formed from a nitrile material. During assembly, gasket 140 may be lightly lubricated, for example, with a silicone grease.

Housing 100 comprises an interior cavity 134 within housing cone 130. On the front end of housing 100, interior cavity 134 is sealed from the intrusion of fluid by lens dome 110, sealing ring 120, and lip 132. On the rear end of housing 100, interior cavity 134 is sealed from the intrusion of fluid by the mating of housing cone 130 and cap 150, with gasket 140 compressed between housing cone 130 and cap 150. Interior cavity 134 may be sized and shaped to precisely fit imaging assembly 200.

During assembly, prior to mating cap 150 to housing cone 130, imaging assembly 200 may be installed into interior cavity 134. Imaging assembly 200 may comprise a lens 210, mounted within a lens holder 220, which is fastened to the front side of printed circuit board 230, facing lens dome 110. Printed circuit board 230 may comprise an imaging sensor, an image processor, one or more screw holes 238 for fastening lens hold 220 to printed circuit board 230 via one or more screws 240 or other fastening mechanisms, other passive components, and/or the like. Printed circuit board 230 may have a circular profile in a plane that is perpendicular to longitudinal axis L (i.e., parallel to lens dome 110). This is in contrast to conventional submersible cameras, in which a rectangular printed circuit board extends in a plane along the longitudinal axis (i.e., perpendicular to lens dome 110). Printed circuit board 230 is oriented perpendicular to longitudinal axis L, which enables housing assembly 100 to be shorter along longitudinal axis L than such conventional submersible cameras. The outer diameter of printed circuit board 230 may precisely or closely match the inner diameter of housing cone 130, such that printed circuit board 230 fits snugly within housing cone 230.

Imaging assembly 200 may be assembled by fastening lens holder 220 to printed circuit board 230, for example, via screw(s) 240. Screw(s) 240 may comprise or consist of two screws 240 on opposing radial sides of printed circuit board 230. Lens holder 220 may be formed from metal and comprise screw thread(s) 228 that align with screw hole(s) 238 in printed circuit board 230, and are configured to receive screw(s) 240. In other words, screws 240 are inserted through screw holes 238 and into screw threads 228, to thereby fasten lens holder 220 to the front side of printed circuit board 230. In addition, lens 210 may be mounted in lens holder 220 via one or more engagement members 216, on a radially outward facing surface of lens 210, that are configured to mate with one or more corresponding engagement members 226 on a radially inward facing surface of lens holder 220. For example, engagement member(s) 216 and 226 may comprise threads that are configured to mate or engage with each other when screwed together. During assembly, engagement member(s) 216 and 226 may be adhered to each other using an adhesive, such as a threadlocker or the like, to thereby permanently fix lens 210 in lens holder 220.

Lens 210 may comprise a wide aperture that is configured to capture a wide field of view (e.g., 120 degrees or more). For example, lens 210 could be a fisheye lens. In addition, lens 210 may be meticulously controlled by printed circuit board 230 to correct for pin-cushioning distortion, which is typical in underwater imaging. In particular, water has a different refractive index than air, which causes pin-cushioning distortion. The focus of lens 210 may be checked and/or calibrated by connecting printed circuit board 230 to a test computer to configure the focus prior to assembly and/or use.

Cap 150 may comprise a central aperture 154 extending through cap 150 along longitudinal axis L. Central aperture 154 is configured to receive a cable therethrough. In particular, a cable (not shown) may extend from the rear of imaging assembly 200, through central aperture 154 in cap 150, and into an external environment at the rear of submersible camera 10. The cable may be attached on one end to the rear side of printed circuit board 230 via soldering or other suitable means. The cable can be used to provide both power to printed circuit board 230 and a communicative coupling for data transfer between printed circuit board 230 (e.g., the image processor of printed circuit board 230) and an external system (e.g., Ethernet router, onboard computer, etc.).

Central aperture 154 around the cable may be sealed using a sealing compound, such as an epoxy, to prevent the intrusion of fluid into cavity 134 through the area between the outer diameter of the cable and the inner diameter of central aperture 154, as well as to bond the cable to cap 150. The sealing compound creates a mold around the cable. In order to create a stronger bond, an organic solvent could be used to roughen the sides of the cable before the sealing compound is applied. The organic solvent may include, without limitation, dimethyl ketone.

Lens 210, within lens holder 220, may receive light through lens dome 110, and focus this light onto the imaging sensor on printed circuit board 230. The image processor on printed circuit board 230 may process the image data formed on imaging sensor, and transmit these image data along the cable to an external system connected to the other end of the cable. It should be understood that the image data may be used by that external system or relayed to one or more other external systems. Ultimately, a computer, whether onboard the underwater vehicle or at a remote operator terminal, may display the transmitted image data as image frames (e.g., real-time video) to an operator that may be monitoring and/or controlling the underwater vehicle.

Figure 3:
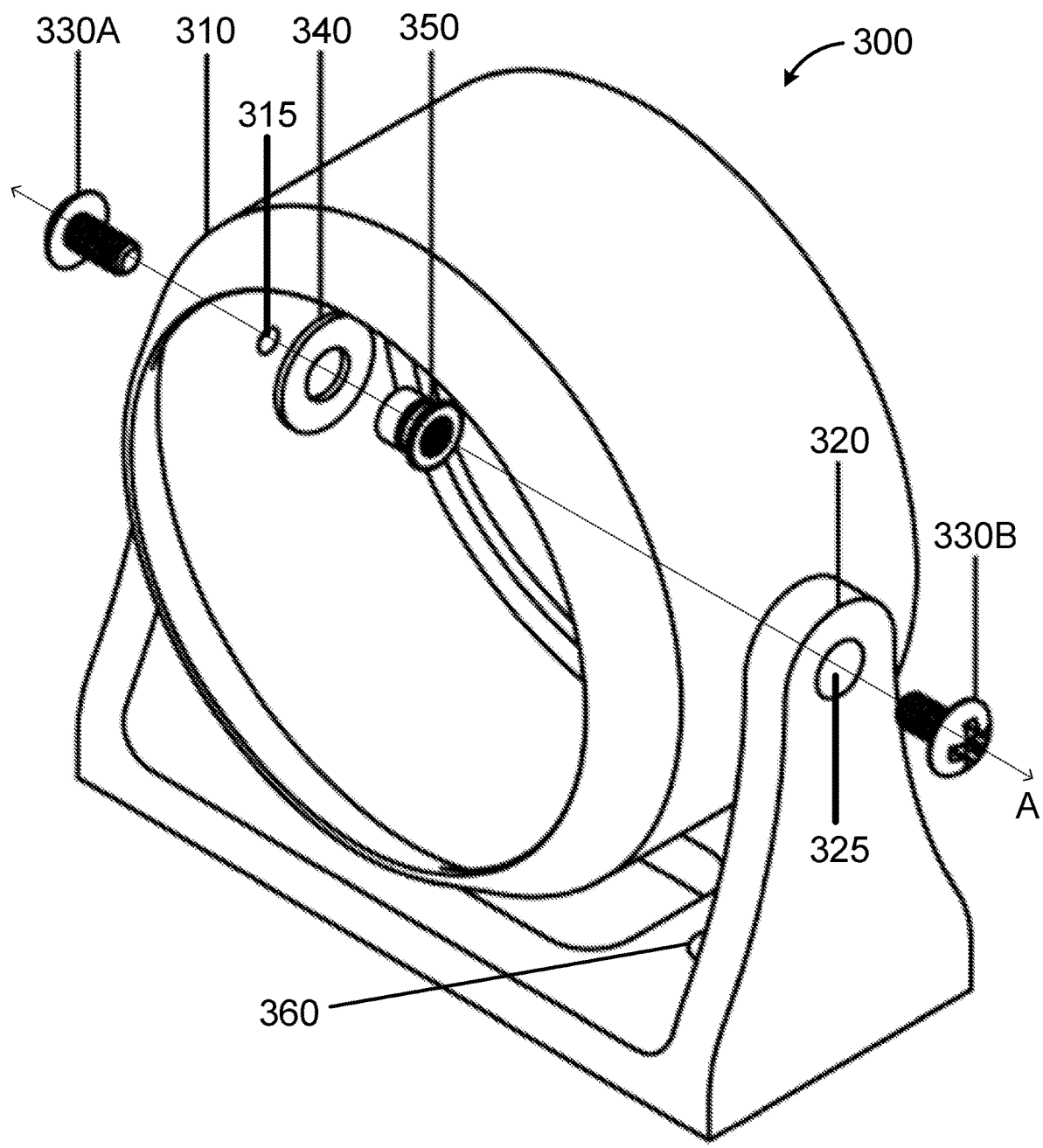
FIG. 3 illustrates an exploded perspective view of a mount for a submersible camera, according to an embodiment.

FIG. 3 illustrates an exploded perspective view of a mount 300 for submersible camera 10, according to an embodiment. Mount 300 may comprise a camera holder 310 and stand 320. Camera holder 310 may be formed from a flexible material, including, without limitation, thermoplastic polyurethane. Stand 320, which may comprise a base and two arms extending from the base, may be formed from acrylonitrile butadiene styrene or other suitable material.

Camera holder 310 may be annular and configured to encircle and hold submersible camera 10. Camera holder 310 may comprise apertures 315 on opposing sides. Camera holder 310 may be inserted between the arms of stand 320, and then stand 320 may be fastened to camera holder 310 by inserting (e.g., from outer sides of stand 320) each screw 330, illustrated as screws 330A and 330B on opposing sides of mount 300, into a respective aperture 325 in a respective arm of stand 320, an aligned aperture 315 in camera holder 310, and a respective washer 340 and nut 350 on the opposite side (e.g., inner side of camera holder 310) of the respective apertures 325 and 315. Each nut 350 may be threaded inside to receive the respective screw 330 and fix the respective screw 330, relative to nut 350. This secures screws 330, while enabling camera holder 310 to rotate, relative to stand 320, around an axis A through the center of apertures 315 and 325. In other words, stand 320 is fastened to camera holder 310 at two points, such that camera holder 310 is rotatable around axis A through the two points. Camera holder 310 may be configured to rotate 360 degrees relative to stand 320, or may be configured to rotate within some range of angles, relative to stand 320, around axis A, that is less than 360 degrees. Washer 340 may be formed from a thin hard plastic, such as polyvinyl chloride, so as not to scratch the anodized housing cone 320. In an alternative embodiment, washer 340 and nut 350 may be replaced by an integrated nut.

Stand 320 may comprise one or more apertures 360, which enable stand 320 to be fastened to an external structure. It should be understood that the external structure may comprise a component of an underwater vehicle to which submersible camera 10 is to be attached. While a particular type of stand 320 is illustrated, it should be understood that other types of stands or mountings may be utilized, or stand 320 may be omitted altogether, depending on the manner in which submersible camera is to be attached to the underwater vehicle. For example, camera holder 310 may be configured to rotate around a plurality of axes, instead of a single axis A. In any case, camera holder 310 may be configured to move under the control of a processing system, such that the imaging axis of submersible camera 10 can be changed relative to the underwater vehicle.

Figure 4:
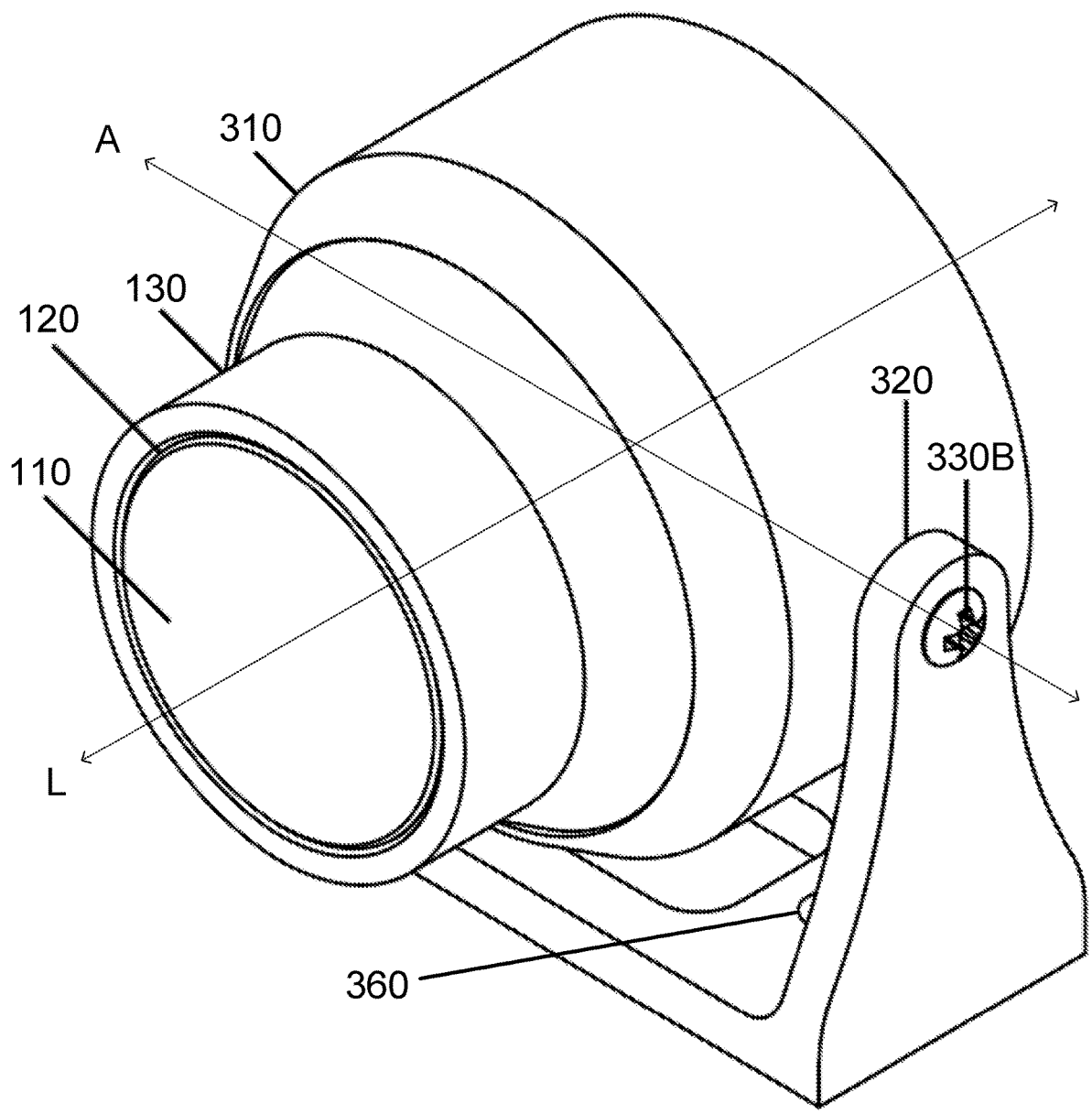
FIG. 4 illustrates a perspective view of a submersible camera in a mount, according to an embodiment.

FIG. 4 illustrates a perspective view of submersible camera 10 in mount 300, according to an embodiment. As illustrated, housing 100 is configured to fit snugly within camera holder 310, with the front of housing cone 130, including lens dome 110 and sealing ring 120 extending out of the front of camera holder 310.

It should be understood that the cable will extend out of the rear of housing 100. This cable may restrict the range of angles in which camera holder 310, with submersible camera 10 mounted therein, can rotate relative to stand 320. The cable may provide both electrical power to imaging assembly 200, as well as communication between imaging assembly 200 and an external system. For example, the cable may be an Ethernet cable with an Ethernet plug on the external end for communication with the Ethernet port of an external device, such as an Ethernet router or the onboard computer. Alternatively, the cable may be a Universal Serial Bus (USB) cable with a USB plug on the external end for communication with the USB port of an external device, such as an external router or the onboard computer. In either case, the cable may be ruggedized to withstand various harsh environments, such as deep-sea environments. It should be understood that, if the cable is an Ethernet cable, the image processor of printed circuit board 230 may be configured to communicate via the Ethernet protocol, and, if the cable is a USB cable, the image processor of printed circuit board 230 may be configured to communicate via the USB protocol.

Image data from each submersible camera 10 of an underwater vehicle may be transmitted, either by an Ethernet router or an onboard computer, communicatively coupled to the cable, to a top-side computer via a tether. The top-side computer is external to the underwater vehicle, and may be located at a facility on land (e.g., a building) or water (e.g., a ship or submarine) that is external to the underwater vehicle. Tethering may comprise any type of communicative coupling, but generally involves a long cable connecting the underwater vehicle to the facility from which the underwater vehicle is being operated.

In an embodiment, the cable of submersible camera 10 conforms to the USB standard. A USB cable may be more practical for submersible camera 10, since an underwater vehicle will already require an onboard computer to control motors, sensors, and other equipment. The cable of each submersible camera 10 may be plugged directly into a USB port of the existing onboard computer. It should be understood that a plurality of submersible cameras 10 may be plugged into the onboard computer in this manner. This onboard computer may combine the image data captured by each submersible camera 10 together, and output the combined image data to a single Ethernet interface in combination with motor and other signals. Advantageously, this reduces the computational processing needed on printed circuit boards 230 within submersible cameras 10 themselves, since the external computer can perform the image processing necessary to stream the image data. This also eliminates the need for an Ethernet router, since a communication signal can be directly transmitted from the onboard computer to the top-side computer via the tether.

Advantageously, the design of submersible camera 10 utilizes fewer components and a smaller size than conventional submersible cameras, which enables submersible camera 10 to have lower production costs than conventional submersible cameras. This compact design also enables submersible camera 10 to be mounted in more locations on an underwater vehicle, and/or for more submersible cameras 10 to be mounted on the underwater vehicle. In addition, submersible camera 10 has a high depth rating, high reliability, and wide compatibility, such that submersible camera 10 can be incorporated into either a shallow-water or deep-sea underwater vehicle.

The lower cost of submersible camera 10, relative to conventional systems, may allow for broader participation in ocean exploration by operator-controlled or autonomous underwater vehicles. Current underwater vehicles (e.g., ROVs and AUVs) are limited by the cost and size of the equipment. The numerous camera systems, required by such underwater vehicles, contribute significantly to this cost and size. Accordingly, disclosed embodiments of submersible camera 10 may significantly lower the cost of underwater vehicles, which may enable a wider array of operators to afford underwater vehicles, while also enabling the underwater vehicles to be more compact, maneuverable, and capable of adapting to changes in the underwater environment.

In addition, the size and versatility of submersible camera 10 enables a submersible camera 10 to be quickly and easily swapped in or out in the event that an existing submersible camera 10 fails. Furthermore, additional submersible cameras 10 can be easily mounted on an underwater vehicle, to improve the vehicle's vision, without extensive modifications. An operator using the underwater vehicle may be able to perform tasks that include, without limitation, surveying underwater (e.g., ocean) ecosystems, inspecting gas wells or pipelines, maintaining offshore wind farms, and/or the like.

While the present disclosure has primarily described a submersible camera 10, a different type of electronic system may be housed within interior cavity 134 of housing 100. In other words, imaging assembly 200 may be replaced with a different electronic system. Examples of such electronic systems include, without limitation, other optical systems, a lighting system, a sonar system, a laser, or the like. Thus, housing 100 may be utilized, separate from any particular electronic system, to provide a sealed, waterproof cavity 134 for an electronic system that utilizes a cable (e.g., in which case, central aperture 154 may be included in cap 150) or without a cable (e.g., in which case, central aperture 154 may be omitted from cap 150).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of" "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A submersible camera comprising:
   a housing assembly that comprises
      a housing cone,
      a transparent lens dome, and
      a sealing ring between a radially outward facing circumferential edge of the lens dome and a radially inward facing surface of the housing cone, wherein the sealing ring is annular around a longitudinal axis of the submersible camera, and wherein the sealing ring completely overlaps and surrounds the circumferential edge of the lens dome from a front side of the lens dome to a rear side of the lens dome; and
   an imaging assembly positioned within an interior cavity of the housing assembly, wherein the imaging assembly comprises
      a printed circuit board,
      a lens holder fastened to one side of the printed circuit board facing the lens dome, and
      a lens mounted in the lens holder.

2. The submersible camera of claim 1, wherein the housing assembly has a circular profile in a plane that is perpendicular to the longitudinal axis, and wherein the printed circuit board is oriented perpendicularly to the longitudinal axis with a circular profile in a plane that is perpendicular to the longitudinal axis.

3. The submersible camera of claim 1, wherein the housing assembly further comprises a cap that is fastened to the housing cone on an opposite end of the housing cone as the lens dome.

4. The submersible camera of claim 3, wherein the cap is fastened to the housing cone via corresponding threads.

5. The submersible camera of claim 4, wherein the housing cone comprises first threading on a first radially facing surface, wherein the cap comprises second threading on a second radially facing surface, and wherein the first threading and the second threading are configured to engage with each other to fasten the cap to the housing cone.

6. The submersible camera of claim 3, wherein the cap comprises a central aperture extending through the cap along the longitudinal axis, wherein the central aperture is configured to receive a cable therethrough.

7. The submersible camera of claim 6, wherein the cable is attached on one end to the printed circuit board and extends from the printed circuit board, through the central aperture, and into an external environment of the submersible camera, and wherein the cable provides both power to the printed circuit board and data transfer with the printed circuit board.

8. The submersible camera of claim 7, wherein the central aperture with the cable extending therethrough is sealed by a sealing compound.

9. The submersible camera of claim 8, wherein the sealing compound is epoxy.

10. The submersible camera of claim 3, wherein the housing assembly further comprises a gasket between the housing cone and the cap, and wherein the gasket is annular around the longitudinal axis.

11. The submersible camera of claim 10, wherein the gasket is formed from a nitrile material.

12. The submersible camera of claim 1, wherein the sealing ring is formed from a hard polymer material.

13. The submersible camera of claim 12, wherein the sealing ring is formed from thermoplastic copolyester.

14. The submersible camera of claim 12, wherein the sealing ring is formed from thermoplastic elastomer.

15. The submersible camera of claim 12, wherein the sealing ring is formed from polytetrafluoroethylene.

16. The submersible camera of claim 1, wherein the circumferential edge of the lens dome is beveled.

17. The submersible camera of claim 1, wherein the housing cone comprises a lip that extends radially inward relative to the radially inward facing surface of the housing cone, and wherein the lip abuts one side of the lens dome.

18. The submersible camera of claim 1, wherein the lens is mounted in the lens holder via corresponding threads.

19. A system comprising:
the submersible camera of claim 1; and
a mount comprising a camera holder that encircles the submersible camera.

20. The system of claim 19, wherein the mount further comprises a stand that is fastened to the camera holder at two points, such that the camera holder is rotatable around an axis that extends through the two points.

* * * * *